W. F. JACOBS.
STANCHION.
APPLICATION FILED NOV. 10, 1913.
1,135,526.
Patented Apr. 13, 1915.
2 SHEETS—SHEET 2.
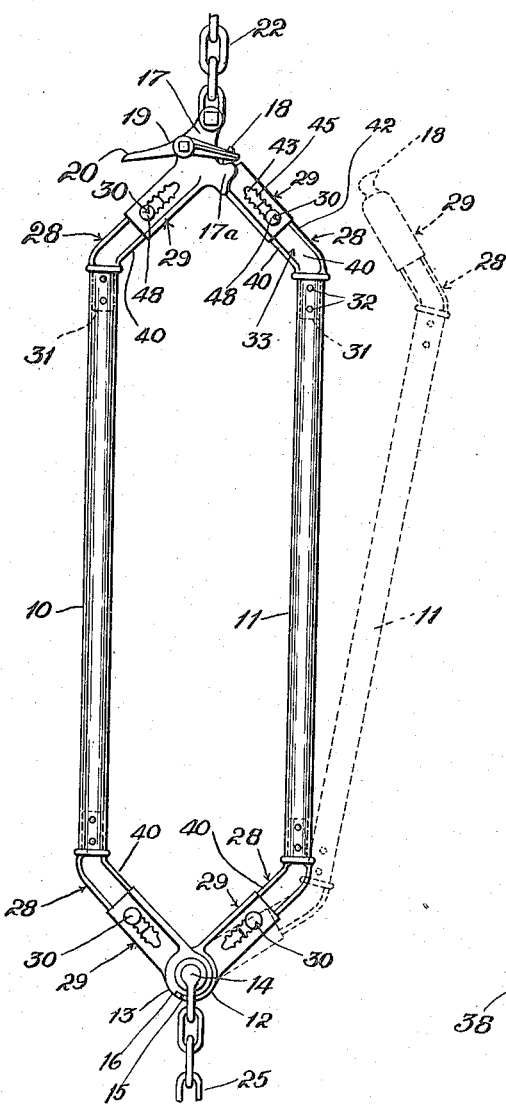
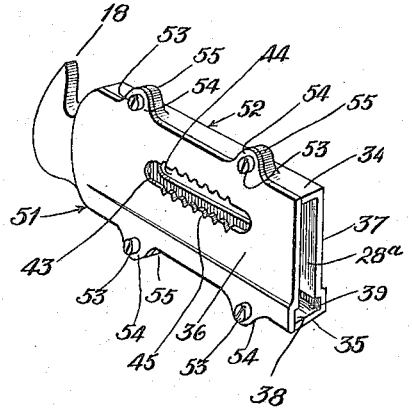
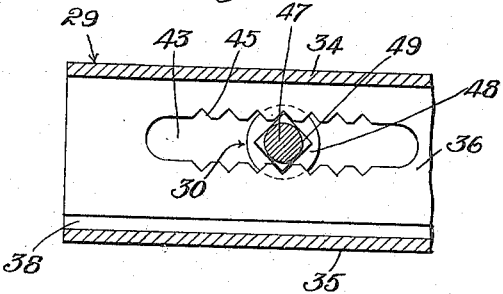
Witnesses:
Harry S Gaither
Inventor:
William F. Jacobs.
By Poole & Cramer
Atty's

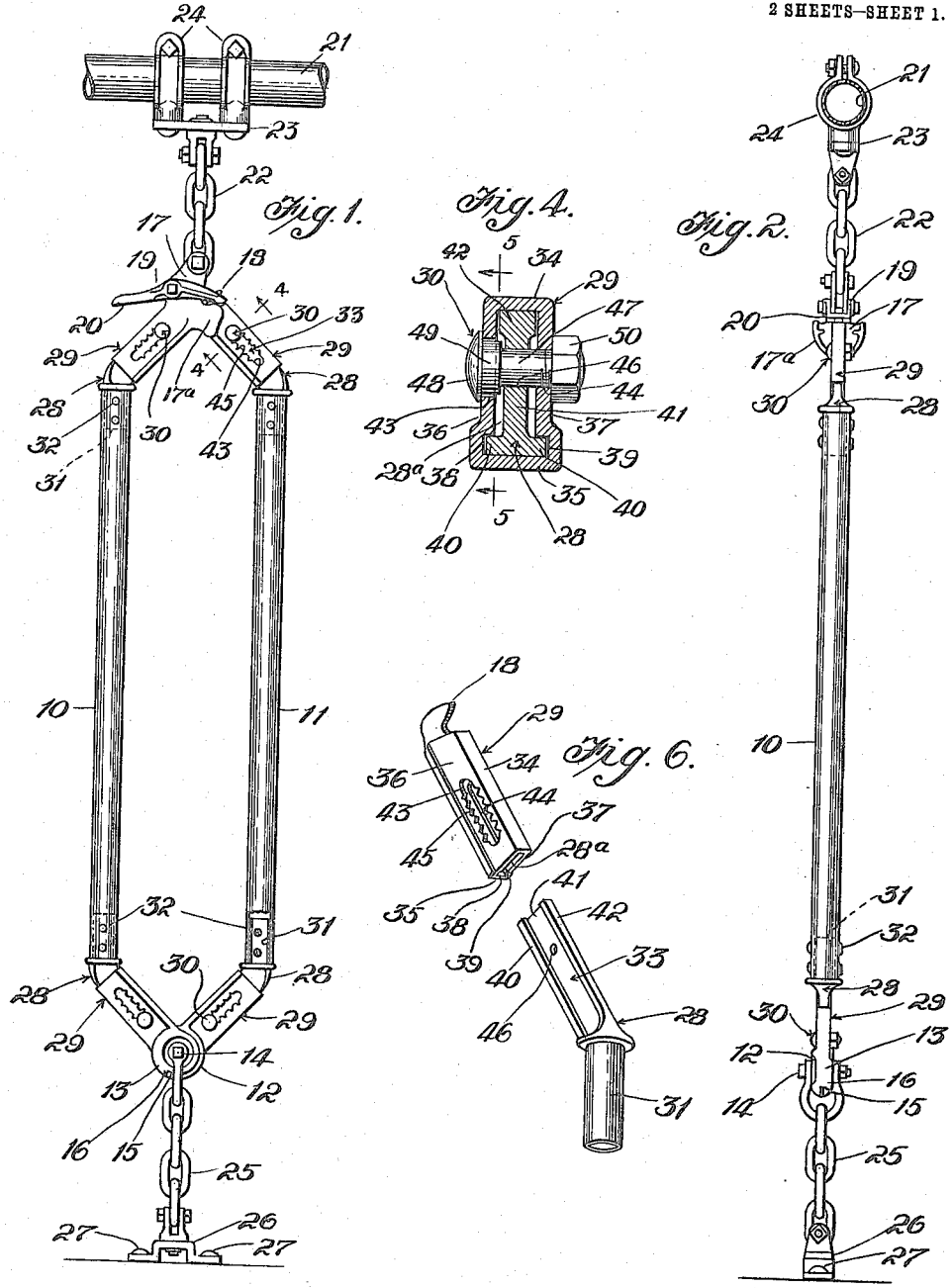

UNITED STATES PATENT OFFICE.

WILLIAM F. JACOBS, OF OTTAWA, ILLINOIS, ASSIGNOR TO J. E. PORTER CO., OF OTTAWA, ILLINOIS, A CORPORATION OF ILLINOIS.

STANCHION.

1,135,526.      Specification of Letters Patent.      Patented Apr. 13, 1915.

Application filed November 10, 1913. Serial No. 800,070.

*To all whom it may concern:*

Be it known that I, WILLIAM F. JACOBS, a citizen of the United States, and a resident of Ottawa, in the county of La Salle and State of Illinois, have invented certain new and useful Improvements in Stanchions; and I do hereby declare that the following is a full, clear, and exact description thereof, reference being had to the accompanying drawings, and to the letters of reference marked thereon, which form a part of this specification.

This invention relates to cattle-stanchions which are mounted in an upright position in a stall and comprise two vertically arranged, oppositely facing, connected side members or bars having hinged or pivotal connection at one end and detachable connection at the other end, so that said bars may be locked when closed to confine the neck of an animal therebetween, or unlocked and swung apart to permit the animal to withdraw its head from between said bars.

Among the objects of the invention is to provide particular improvements in the construction of the kind of a stanchion referred to, so that the side members or bars of the stanchion may be adjusted laterally or toward and from each other for the purpose of increasing or decreasing the confining or transverse space between said bars, and thus the stanchion made to accommodate an animal having a thin or thick neck. An animal of short body length generally has a rather thick neck, while the converse is true of an animal having a long body. A stanchion embodying the features of my invention may be adjusted to accommodate either one of these animals and prevent the animal from working its head from between the bars when connected.

The invention consists further in the matters hereinafter described and more particularly pointed out in the appended claims.

In the accompanying drawings:—Figure 1 is a view in front elevation of a stanchion embodying the features of my invention, the side members or bars thereof being closed and shown in one position of their lateral adjustment; Fig. 2 is a view in side elevation of the parts shown in Fig. 1; Fig. 3 is a view similar to that shown in Fig. 1, with the exception that the side members or bars of the stanchion are shown in a different adjusted position; Fig. 4 is a view representing an enlarged transverse section taken on line 4—4 of Fig. 1; Fig. 5 is a view in longitudinal section, taken on line 5—5 of Fig. 4; Fig. 6 is a perspective view of one of the sets or pairs of members located at the opposite ends of the stanchion, said members being shown disconnected; and Fig. 7 is a perspective view of one of said members constructed a little differently than the corresponding member shown in the preceding figure.

The drawings illustrate in detail the preferred manner in which a stanchion embodying my invention is constructed. As shown in the drawings, the stanchion comprises two oppositely facing, vertically arranged, side members or bars 10, 11, having their upper and lower ends directed inwardly toward each other. The side bars 10, 11 are connected at one end of the stanchion, preferably the lower end thereof, by a hinge of any preferred construction, and are provided at the other end of the stanchion, preferably the upper end thereof, with a detachable connection, preferably in the form of a snap latch. The hinged connection for the lower ends of the bars 10, 11 is formed by providing an eye 12 at the lower end of the bar 11, and a yoke 13 at the corresponding end of the other bar 10, said eye being adapted to enter between the arms of said yoke, and such parts being connected by means of a pivot bolt 14. Both the eye 12 and the yoke 13 are provided with a lug 15, 16, respectively, adapted to strike or come into contact with each other in the swinging of the bars apart above the pivot bolt 14. Thus, the bars 10, 11 are prevented from being swung or moved apart farther than necessary to permit the head of the animal to pass between them. The snap latch for the upper ends of the bars 10, 11 comprises a member 17 at the upper end of the bar 10. Said member 17 is provided with a laterally extending keeper 17ª opening toward the bar 11. Said keeper 17ª is adapted to receive the upper end of the bar 11 when the upper end of the latter is swung toward and into contact with the upper end of the bar 10. The upper end of the bar 11 is provided with an upright lug 18 adapted, when the bars are closed and the upper end of the bar 10 is within the keeper 17ª, to enter within an aperture (not shown) in the end of a spring-pressed locking latch 19 pivotally mounted on the member 17. Said locking latch 19 is provided with a finger piece or lever 20 by means of which the latch may be depressed for unlocking and releasing the bars 10, 11. When the bars 10, 11 are unlatched, the bar 11 swings away from the bar 10, and is supported in open position by contact of the lugs 15, 16. (See dotted lines in Fig. 3.)

The stanchion is mounted in an upright position in a stall by being suspended from the overhead rail 21 thereof by means of a flexible member, preferably in the form of a chain 22 connected at its lower end with the member 17 and having swiveled connection at its upper end with a plate 23 detachably connected with the overhead rail 21 by means of clamp collars 24, 24. (See Figs. 1 and 2.) A chain 25 connects the lower end of the stanchion with the floor or bottom sill of the stall and prevents the stanchion from being swung or moved out of its vertical position. Said chain 25 is connected with the lower end of the stanchion by having connection at its upper end with the pivot bolt 14 and a swivel connection at its lower end with a plate or member 26 rigidly secured by bolts 27 to the floor or bottom sill of the stall. (See Figs. 1 and 2.) By swivelly mounting the stanchion in the stall, the stanchion may be swung about a vertical axis and thus the animal held by the stanchion may turn its head without undue hindrance from side to side.

In order to permit the side bars 10, 11 of the stanchion to be adjusted laterally or, in other words, to be moved toward and from each other for the purpose of increasing or decreasing the confining space between said bars and thus make the stanchion accommodate animals having necks of varying thickness, the side members or bars of the stanchion are connected, when closed, by means permitting such adjustment. Such means is preferably constructed as follows: At both the upper and lower ends of each of the side bars 10, 11, are a plurality of members 28, 29, adapted to have endwise adjustable connection with each other. Said members 28, 29 are maintained in any endwise adjusted position by a clamping member 30 adapted to detachably engage both of said members 28, 29. One of the members 28, 29 at each end of each side bar 10, 11 is connected with the adjacent side bar, while the other of said members at each end of the stanchion are connected with each other when the stanchion is closed. As each of the members 28, 29 has endwise adjustable connection with the other, and one of said members is connected with the adjacent side bar 10, 11, said bars may be adjusted laterally so as to increase or decrease the confining space between said bars by moving said members 28, 29 endwise relatively to each other. The side bars are held in any position of adjustment by clamping the members 28, 29 together through the medium of the clamp members 30. As all of the members 28, 29 at each end of each side bar 10, 11 are substantially the same in construction, a description of but one set of these members, it is thought, will suffice for all.

In the form of stanchion shown, the side bars 10, 11 are preferably in the form of open end tubes or pipes. The member 28 is preferably in the form of a casting provided with a tubular portion or shank 31 adapted to enter and fit within the open end of the associated side bar of the stanchion. Said tubular portion 31 is secured to the bar by rivets 32. (See Fig. 1.) Said casting 28 is also provided with a part 33 preferably in the form of a tongue obliquely arranged with respect to the tubular portion 31. When the casting 28 is secured to the side bar, the tongue 33 extends toward the tongue of the like casting secured to the corresponding end of the other side bar. The member 29 is preferably in the form of a hollow casting, the longitudinal recess or chamber 28$^a$ therein opening through one end of said casting. Said tongue 33 is adapted to enter and slide endwise in said chamber 28$^a$. As shown in the drawings, said castings 29 at the lower end of the stanchion are provided with the eye 12 and yoke 13, respectively, while the castings 29 at the upper end of the stanchion carry the member 17 and locking lug 18, respectively. Said casting 29, as shown in the drawings, is rectangular in cross-section, the chamber 28$^a$ therein being formed by top, bottom and side walls 34, 35, 36 and 37, respectively, all of which, in the form of casting 29 shown in Figs. 1 to 6 both inclusive, are integral. The side walls 36, 37 are each provided, preferably at the lower end of the chamber 28$^a$, with longitudinal, oppositely facing grooves 38, 39, respectively, adapted to receive the lateral flanges 40 on the web 41 of the tongue 33 when the latter is inserted into said hollow casting 29. (See Fig. 4.) The upper longitudinal edge 42 of said web 41 is enlarged and fits within the upper end of the chamber 28$^a$. (See Fig. 4.) The web 41 is narrower than the chamber 28$^a$ and it follows that said web does not have contact with the side walls 36, 37 of said chamber 28$^a$. Each of the side walls 36, 37 is provided with an elongated slot 43, 44, the longitudinal edges of the former being provided with notches 45 while the like walls of the latter are continuous or smooth. Said web 41 is provided intermediate its ends, and in the same plane as the slots 43, 44, with an aperture 46.

The clamping member 30 is preferably in the form of a bolt, the shank 47 of which is adapted to extend through both the slots 43, 44, and aperture 46, when the tongue 31 is within the chamber 28ª, as best shown in Fig. 4. The head 48 of said bolt is adapted for contact with the outer face of the side wall 36 and bridges the slot 43 therein, while the opposite end of the shank 47 extends through the slot 44 and exterior to the side wall 37. The portion of the shank 47 within the notched slot 43 is square in cross-section, as best shown in Figs. 4 and 5. When said bolt is in position with its shank extending through the slots 43, 44 and aperture 46, the bolt is held in such position by means of a clamp nut 50 applied upon the free end of said shank. The bolt, when the tongue 33 is within the chamber or recess 28ª, is carried by the tongue 33 and moves therewith. When it is desired to clamp the members 28, 29 together and prevent endwise movement of the members relatively to each other, the bolt is turned until the corners of the squared part 49 engage the notches 45 and the nut 50 is clamped against the side wall 37. In this manner, the members 28, 29 are held in any adjusted position, and consequently the side bars 10, 11 of the stanchion are held in like adjusted position. To adjust or move the side bars of the stanchion toward or from each other, the clamp nuts 50 are loosened, the bolts turned to effect the disengagement of the corners of the squared parts 49 from the notches 45, and the members 28 moved endwise of the members 29 carrying the bolts therewith in the lateral movement of the side bars 10, 11. After the parts have been given the desired adjustment, the parts are clamped in adjusted position, in the manner hereinbefore described.

In use, the stanchion is mounted in a stall in the manner shown in Figs. 1, 2 and 3. In Fig. 1, the side bars or members 10, 11 of the stanchion are shown in the position they occupy at their inner limit of adjustment or at their minimum adjustment and the confining space between said bars is sufficient to accommodate an animal having the smallest width of neck, as for instance a slim cow or the like. To adjust the side members or bars 10, 11 to the extreme outer limit of adjustment, the telescoping members 28, 29 are unclamped and the side bars moved away from each other until their movement is stopped by contact of the bolts 30 with the outer ends of the slots 43, 44. In Fig. 3, the side bars of the stanchion are shown in this position of adjustment, the transverse of confining space between the side bars 10, 11 is sufficient to accommodate an animal having the widest or thickest neck, such as usually found in heavy animals. It is of course apparent that, should it be desired to adjust the side bars 10, 11 to any position between minimum and maximum adjustments, namely between the ends of the slots 43, 44, the members 28, 29 are unclamped and the bars moved laterally in the desired direction the desired distance and stopped when the bolts 30 stand at any point intermediate the ends of the slots 43, 44. Thus it is apparent that, with a stanchion provided with means permitting lateral adjustment of the side bars thereof, the stanchion may be made to accommodate animals having necks of varying thicknesses. In the adjustment of the stanchion from one extreme position to the other, namely from a position shown in Fig. 1 to that shown in Fig. 3, the length of the stanchion increases or decreases in accordance with the lateral adjustment of the side bars 10, 11 and the lower chain 25 has sufficient length to permit of such lengthening and shortening of said stanchion. By reason of the fact that the side bars of the stanchion are adjustable, insulating linings in the form of wood facings or the like may be applied to the vertically opposed faces of the side bars 10, 11, without decreasing the desired transverse distance between said bars, the side bars having been first adjusted laterally a sufficient distance so that the distance between the insulating linings will be one desired.

It will be noted that angular relation between the tubular stem 31 and tongue 33 of each casting 28 is the same in all of the castings, and it follows, therefore, that the castings or members 28, 29 at the top and bottom of the stanchion remain at the same angle when fully extended or adjusted and thus the side bars 10, 11 of the stanchion in the fully adjusted position remain parallel to each other and in upright position.

Instead of making the hollow casting 29 in one integral piece, as shown in the first six figures of the drawings, said member 29 may be made, for convenience in assembling, in two parts, 51, 52, as shown in Fig. 7. Said parts 51, 52 are connected together by means of fastening members, preferably in the form of machine screws or the like 53 inserted through alined ears 54, 55 on the respective parts 51, 52. In this form of member 29, the same is constructed exactly like the member 29 shown in the first six figures of the drawings, except with the difference noted, and in the form of the member 29 shown in Fig. 7 the parts which correspond with the like parts in the first six figures of the drawings are indicated by like reference characters. The member 29 shown in Fig. 7 is the member which is applied to the upper end of the side bar 11 and therefore is provided with the locking lug 18, the same being connected with the part 52 of said member. In making the member 29 for the other end of the bar 11 and for the upper and lower ends of the bar 10, the part 52 will of course be provided with either of the members 12, 13 or 17, depending of course where said member 29 is to be located.

In a stable or barn where there are a number of stalls arranged side by side and with a stanchion in each stall being capable of adjustment as hereinbefore described, each stanchion may be adjusted to accommodate the neck of the animal occupying such stall, no matter what the width of neck such animal may be as compared with the widths of necks of the other animals in the other stalls. In other words, each stanchion is adjusted to the neck of the animal to be held thereby. It is apparent that, should each stanchion in each stall be standard or, in other words, the transverse distance between the side bars of each stanchion in each stall be the same, there may be a number of stanchions that would not properly hold the animal in the stall, due to the fact that the transverse distance between the bars of that stanchion would be proportionately greater than the thickness of the neck of the animal to be held by such stanchion, and thus permit the animal to work its head from between the side bars of the stanchion, while in other stalls the transverse distance between the side bars of the stanchion may be proportionately less than the thickness of the neck of the animal to be held by such stanchion and thus confine the neck of the animal between the side bars of the stanchion so tightly as to cause discomfort to the animal held thereby. With stanchions capable of adjustment, as hereinbefore described, these difficulties are overcome and each stanchion in each stall adjusted to accommodate the neck of the animal occupying the stall so as to hold the animal in the stall without discomfort. Furthermore, with a stanchion capable of adjustment as hereinbefore described, the stanchion in one stall may be readily adjusted to accommodate the new animal to occupy such stall, or, in case it may be desired to interchange the animals, the adjustment of the stanchion may be readily effected so as to accommodate the animal to be held thereby.

While I have shown and described herein certain details of construction and arrangements of the several parts of the preferred form of my invention, it is to be understood that these may be changed and variously modified without departing from the spirit of my invention, and I do not wish to be limited to the construction and arrangements shown except as particularly pointed out by the appended claims.

I claim as my invention:—

1. A stanchion, comprising two side bars, a pair of members located at each end of each of said bars and having endwise sliding engagement with each other, and clamping means adjustably clamping the members of each pair together; one of the members of each pair being secured to the end of the adjacent bar and the other of the members of each pair having pivotal connection with each other at one end of the stanchion and detachable connection with each other at the opposite end of the stanchion.

2. A stanchion, comprising two side bars, a pair of members located at each end of each of said bars; one of the members of each pair being provided with a longitudinal recess, and the other of said members of each pair being provided with a tongue adapted to enter and slide endwise in said recess, and means adjustably connecting the members of each pair together; one of the members of each pair being connected with the adjacent bar, and the other of the members of each pair at each end of the stanchion being connected, when the stanchion is closed, by means independent of the means adjustably connecting the members of each pair together.

3. A stanchion, comprising two side bars, a pair of members located at each end of each of said bars, one of said members of each pair being hollow and having top, bottom and side walls forming therebetween a longitudinal chamber opening through one end of said hollow member, and the other of said members of each pair being secured to the adjacent bar and provided with a tongue adapted to enter and slide endwise in said chamber, and means adjustably connecting the members of each pair together; the hollow members at each end of the stanchion being connected, when the stanchion is closed, by means independent of the means adjustably connecting the members of each pair together.

4. A stanchion, comprising two side bars, a pair of members located at each end of each of said bars and having telescopic engagement with each other, one of the members of each pair being provided with a longitudinal slot, and the other of the members of each pair being provided with an aperture, and a fastening bolt adapted to be inserted through said slot and aperture for adjustably connecting the members of each pair together; one of said members of each pair being secured to the adjacent bar, and the other of the members of each pair having pivotal connection with each other at one end of the stanchion and detachable connection with each other at the opposite end of said stanchion.

5. A stanchion, comprising two vertically arranged side bars, a pair of members located at each end of each of said bars, one of the members of each pair being provided with a longitudinal recess, one of the walls of which is provided with a longitudinal slot having notched edges, the other of the members of each pair being provided with a part adapted to enter and slide endwise in said recess, said part being provided with an aperture, a clamping bolt for the members of each pair adapted to be inserted through said slot and aperture for detachably clamping the members of each pair together, said bolt being provided with a squared member adapted to engage the notched edges of said slot; one of the members of each pair being secured to the adjacent bar, the other of the members of each pair at each end of the stanchion being connected when the stanchion is closed.

6. A stanchion, comprising two vertically arranged, tubular side bars, a pair of members located at each end of each of said bars, one of the members of each pair being provided with a longitudinal recess, one of the walls of which is provided with a longitudinal slot having notched edges, the other of the members of each pair being provided at one end thereof with a tubular extension adapted to be inserted and secured in the open end of the adjacent bar and at the other end thereof with a tongue adapted to enter and slide endwise in said recess, said tongue being provided with an aperture, a clamping bolt for the members of each pair adapted to be inserted through said slot and aperture; said bolt being provided with a squared member adapted to engage the notched edges of said slot; the recessed members of each pair at each end of the stanchion have pivotal and detachable connection, respectively.

In testimony, that I, claim the foregoing as my invention I affix my signature in the presence of two witnesses, this 5th day of November A. D. 1913.

WILLIAM F. JACOBS.

Witnesses:
F. A. GERDING,
E. J. CASSIDY.

Copies of this patent may be obtained for five cents each, by addressing the "Commissioner of Patents, Washington, D. C."